(12) United States Patent
Sugatoor et al.

(10) Patent No.: US 10,944,663 B2
(45) Date of Patent: Mar. 9, 2021

(54) CATEGORIZATION OF MAC ADDRESS RANDOMIZATION

(71) Applicant: Hewlett Packard Enterprise Development LP, Houston, TX (US)

(72) Inventors: Manaswini Lakshmikanth Sugatoor, Bangalore (IN); Ataur Rehman, Bangalore (IN); Ganesh Valluru Ramakrishnappa, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 134 days.

(21) Appl. No.: 16/114,960

(22) Filed: Aug. 28, 2018

(65) Prior Publication Data
US 2019/0334806 A1 Oct. 31, 2019

(30) Foreign Application Priority Data
Apr. 30, 2018 (IN) .................. IN 201841016316

(51) Int. Cl.
*H04L 12/26* (2006.01)
*H04L 12/24* (2006.01)
*H04L 29/06* (2006.01)
*H04L 29/12* (2006.01)

(52) U.S. Cl.
CPC .......... *H04L 43/10* (2013.01); *H04L 41/0866* (2013.01); *H04L 43/12* (2013.01); *H04L 61/6022* (2013.01); *H04L 69/22* (2013.01)

(58) Field of Classification Search
CPC ............ H04L 41/0866; H04L 61/6022; H04L 61/6081

USPC ........ 709/218, 220, 223, 224; 370/235, 254, 370/401

See application file for complete search history.

(56) References Cited

U.S. PATENT DOCUMENTS

| | | | | |
|---|---|---|---|---|
| 9,998,907 B2* | 6/2018 | Seidman | ............ | G06K 9/00758 |
| 2018/0027399 A1* | 1/2018 | Seidman | .............. | G06K 9/2054 455/456.1 |
| 2018/0048534 A1* | 2/2018 | Banga | .................... | G06N 20/00 |
| 2019/0132292 A1* | 5/2019 | Reimer | ................... | H04L 63/20 |

OTHER PUBLICATIONS

"A Study of MAC Address Randomization in Mobile Devices and When it Fails"—Martin et al https://petsymposium.org/2017/papers/issue4/paper82-2017-4-source.pdf (Year: 2017).*

"A Study of MAC Address Randomization in Mobile Devices and When it Fails"—Martin et al, Proceedings on Privacy Enhancing Technologies, May 2007 https://petsymposium.org/2017/papers/issue4/paper82-2017-4-source.pdf (Year: 2007).*

Chou. Y. et al., Characterizing Wi-fi Network Discovery, (Research Paper), 2016-2017, 68 Pgs.

(Continued)

*Primary Examiner* — Randy A Scott
(74) *Attorney, Agent, or Firm* — Hewlett Packard Enterprise Patent Department

(57) ABSTRACT

Aspects of categorizing MAC address randomization include obtaining probe data for a plurality of time intervals. A likelihood measure of a specified OS type and version belonging to each of a plurality of MAC address randomization categories is determined and the specified OS type and version is categorized based on the likelihood measure.

21 Claims, 6 Drawing Sheets

(56) References Cited

OTHER PUBLICATIONS

Martin, J. et al., A Study of MAC Address Randomization in Mobile Devices and When it Fails, (Research Paper), Proceedings on Privacy Enhancing Technoicgies, vol. 4. pp. 365-363, 19 Pgs.

Martin, J. et al., Decomposition of Mac Address Structure for Granular Device Inference, (Research Paper), Dec. 5-9, 2016, 11 Pgs.

Redondi, A. et al., Building Up Knowledge through Passive WiFi Probes, (Research Paper), Dec. 19, 2017, Computer Communications, pp. 1-12.

Vanhoef, M. et al., Why MAC Address Randomization is not Enough: An Analysis of WiFi Network Discovery Mechanisms, (Research Paper), Jun. 10, 2016, 13 Pgs.

* cited by examiner

CATEGORIZATION OF MAC ADDRESS RANDOMIZATION

BACKGROUND

Media Access Control (MAC) address of a device is an identifier assigned to a network interface unit of the device. MAC addresses are used for identifying devices at data link layer for communicating over a network. When assigned by a manufacturer, a MAC address encodes the manufacturer registered identification number, is unique, and is hard-coded in the network interface unit. The hard-coded MAC address is also referred to as real MAC address. In addition, random virtual MAC addresses may be assigned by an operating system of the device that controls the communications sent and received by the network interface unit. The random virtual MAC addresses, however, may not be unique. Due to its uniqueness, the real MAC address can be used to identify the device, for example, to monitor its location and activities.

BRIEF DESCRIPTION OF FIGURES

Systems and/or methods, in accordance with examples of the present subject matter are now described, by way of example, and with reference to the accompanying figures, in which.

DETAILED DESCRIPTION

Figure 1:
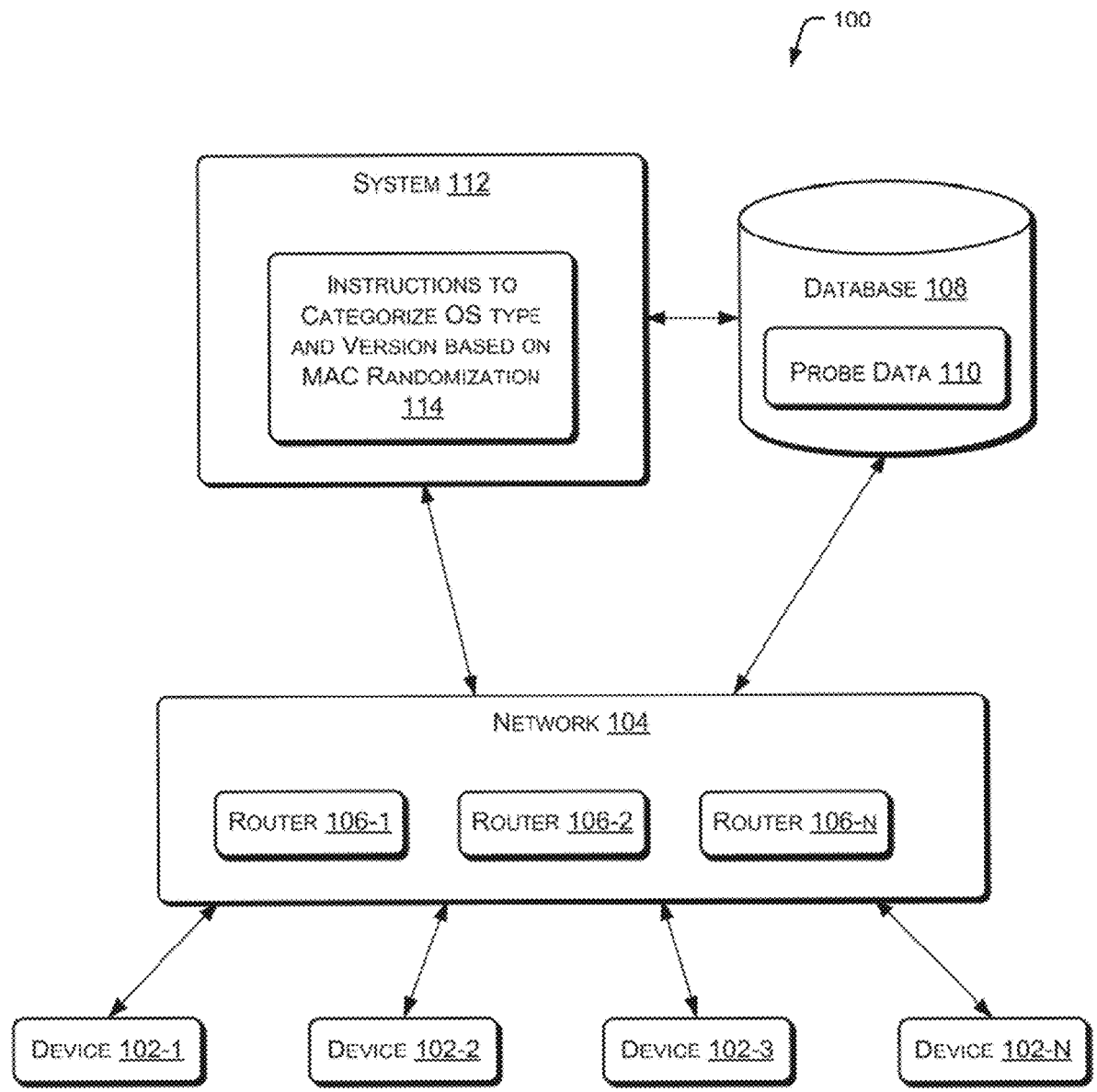
FIG. 1 illustrates an example network environment for categorization of MAC address randomization, in accordance with an example of the present subject matter.

Devices that are enabled to communicate over wireless networks, such as using Wi-Fi, send probe requests to scan available routers in their vicinity. As used herein, a router may include an access point. A probe request may include the MAC address of the network interface unit from which the probe request is sent. The probe requests may be sent periodically in both associated and unassociated devices. Associated devices may be understood as those devices that are connected to a router while unassociated devices may be understood as devices that are not connected to a router.

Generally, after association, the devices send the real MAC address in the probe requests in accordance with various telecommunication standards. However, prior to association, in case the real MAC address is sent in the probe requests, the router can learn about the presence of the device through the MAC address. With increasing data privacy and security concerns, device manufacturers may configure the devices to randomize the MAC addresses prior to association and hence hide the identity of the devices. For this, the device manufacturers may use operating systems that support MAC randomization in the devices. Such devices may send random virtual MAC address in the probe requests prior to association and may send the real MAC address after association. At times, the real MAC address may also be sent from time to time interposed with the random MAC address prior to association.

To determine whether and to what degree an operating system randomizes MAC addresses is generally a time consuming and tedious task. As operating systems evolve over time and different versions of the operating systems are released, the MAC randomization capability of the different versions of the same operating system type also differs. Categorizing the MAC randomization capabilities of different operating system types and versions can help in identifying the devices that present the real MAC address in the probe requests. The information can be used for various purposes, such as increasing security of the devices, gaining insights into device usage patterns, and providing customized value added services to users of the devices.

Aspects of the present subject matter relate to systems and methods for categorization of MAC address randomization capabilities of different operating system types and versions. For ease of discussion, MAC address randomization is also referred to as MAC randomization. In one example, probe data is obtained for a plurality of time intervals, where the probe data in each time interval corresponds to probe requests received from a plurality of devices. In one implementation, each time interval may be of one day and the plurality of time intervals may correspond to thirty days. In other implementations, other durations of time intervals may be used.

In one example, the probe data may be obtained from a memory unit or a database. The probe data corresponding to a probe request of a device includes time stamp of the probe request receipt, Media Access Control (MAC) address of the device, association status of the device, operating system (OS) type of the device, and OS version of the device. From the probe data, a percentage number of devices of a specified OS type and version that display behavior associated with each of a plurality of MAC randomization categories in a time interval can be ascertained. For example, it can be ascertained that in one day what percentage of devices of OS type A version 1 displayed behavior associated with each of a non-randomized category, a partially randomized category, and a mostly randomized category of MAC randomization.

For each of the plurality of MAC randomization categories, a likelihood measure of the specified OS type and version belonging to a MAC randomization category over the plurality of time intervals may be determined based on the percentage number. Further, the specified OS type and version may be categorized based on the likelihood measure. For example, the likelihood measure for a MAC randomization category includes an average percentage of the devices of the specified OS type and version displaying the behavior associated with the MAC randomization category over the plurality of time intervals and a confidence interval of the average percentage.

In one example, the specified OS type and version may be categorized into the MAC randomization category having a maximum likelihood measure when a confidence interval of the maximum likelihood measure does not overlap with a confidence interval of the likelihood measure of another MAC randomization category. In another example, the specified OS type and version may be categorized as being of a non-ascertainable MAC randomization category when a confidence interval of the maximum likelihood measure overlaps with a confidence interval of the likelihood measure of another MAC randomization category.

Thus, the present subject matter can efficiently categorize different OS types and versions based on their MAC randomization capabilities. Further, as the categorization may be based on probe data gathered from multiple devices, the accuracy and relevance of the categorization to actual use scenarios is higher than that obtained from laboratory test results. Moreover, the categorization may be easily refined over time as additional probe data is gathered and new OS types and versions can be included for categorization as and when the corresponding probe data becomes available.

The above systems and methods are further described in conjunction with appended figures. It should be noted that the description and figures merely illustrate the principles of the present subject matter. It will thus be appreciated that various arrangements that embody the principles of the present subject matter, although not explicitly described or shown herein, can be devised from the description and are included within its scope. Moreover, all statements herein reciting principles, aspects, and examples of the present subject matter, as well as specific examples thereof, are intended to encompass equivalents thereof.

In the figures, the left-most digit(s) of a reference number identifies the figure in which the reference number first appears. The same numbers are used throughout the figures to reference like features and components.

FIG. 1 illustrates an example network environment 100 for categorization of MAC randomization, in accordance with an example of the present subject matter. The network environment 100 includes devices 102-1, 102-2, 102-3 . . . 102-n capable of communicating wirelessly, such as using Wi-Fi, over a network 104. The devices 102-1, 102-2, 102-3 . . . 102-n may be collectively referred to as devices 102 and individually as device 102.

The devices 102 may include any device that can connect wirelessly to the network 104 using, for example, Wi-Fi or other such wireless communication protocols. For example, the devices 102 may include a mobile phone, a tablet, a laptop, a smart watch, a wearable device, an Internet of Things (IoT) compatible device, and the like.

The network 104 may be a wireless network or a combination of a wired and wireless network. The network 104 can also include a collection of individual networks, interconnected with each other and functioning as a single large network, such as the Internet. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), Long Term Evolution (LTE), and Integrated Services Digital Network (ISDN).

The network 104 includes one or more routers, such as router 106-1, 106-2 . . . 106-n, collectively referred to as routers 106 and individually referred to as router 106. As used herein, the router 106 may also be an access point. One or more of the routers 106 may be private routers or part of a local area network (LAN) or a wide area network (WAN). Further, the communication network 104 can include various network devices, such as gateways, modems, and the like; however, such details have been omitted for ease of discussion and brevity.

To communicate over the network 104, a device 102 may send probe requests to scan available routers 106 in its vicinity. Thus, each router 106 may receive multiple probe requests from each of the devices 102 in its vicinity. The probe requests may be sent periodically by both associated and unassociated devices. Unassociated devices may be understood as devices that are not connected to a router 106. For example, when the Wi-Fi is switched on in the device 102, but the device 102 is not connected to any wireless connection, it may be referred to as an unassociated device. Associated devices on the other hand may be understood as those devices that are connected to a router 106, and thereby to a wireless connection.

The probe request sent by each device 102 may include information, such as Media Access Control (MAC) address of the device 102, association status of the device 102, operating system (OS) type of the device 102, and OS version of the device 102. The information may also include a timestamp of the time of receipt of the probe request. The OS type refers to the type of OS used in the device, such as iOS™, Windows™, Android™, etc. The OS version refers to the version of the OS type, such as version 1.0, 1.2, etc. MAC randomization capabilities of an OS may differ based on the type of OS and the version as the OS evolves. Hence, in one example, the categorization may be performed for different OS types and versions.

The information received from different devices 102 in the probe requests may be stored by the routers 106 in a database 108 as probe data 110. The database 108 may be implemented as any relational or non-relational database or a memory unit of a computing system. In some implementations, each of the routers 106 may store respective probe data locally, for example, in a respective memory unit and the probe data may then be transferred to a common storage unit, such as the database 108.

In one example, the probe data 110 stored in the database 108 may be divided into a plurality of time intervals. In one example, each time interval may correspond to one day and the plurality of time intervals may correspond to thirty days' data. In this example, the probe data 110 for one time interval will include the probe data associated with probe requests received in one day. In another example, each time interval may correspond to one hour and the plurality of time intervals may correspond to twenty-four hours' data. Thus, in this example, the probe data 110 for one time interval will include the probe data associated with probe requests received in one hour. The probe data corresponding to one probe request may also be referred to as a data point. The length of the time interval and number of time intervals may be varied based on the number of data points received in one time interval.

For example, in case the routers 106 are placed in a location where they receive the probe data 110 from a large number of devices 102, such as in a mall or at an airport, then a smaller time interval may be used since the number of data points collected may be sufficient for robust statistical analysis. In another example, in case a router 106 is placed in a location where it receives the probe data from a relatively small number of devices 102, a larger time interval may be used.

As mentioned above, each device 102 sends probe requests periodically. Hence, the probe data collected in a time interval by a router 106 may correspond to a plurality of probe requests received from each of a plurality of devices 102, both prior to and after association with the router 106.

The network environment 100 further includes a system 112 comprising instructions 114 to categorize different OS types and versions based on MAC randomization capabilities. The system 112 can obtain the probe data 110 from the database 108 and analyze the probe data 110 to perform the categorization. In one example, the system 112 can obtain the probe data 110 over the network 104. In another example, the system 112 may be separately coupled to the database 108, either directly or over a different network. The categorization of different OS types and versions by the system 112 is further explained with reference to FIG. 2.

Figure 2:
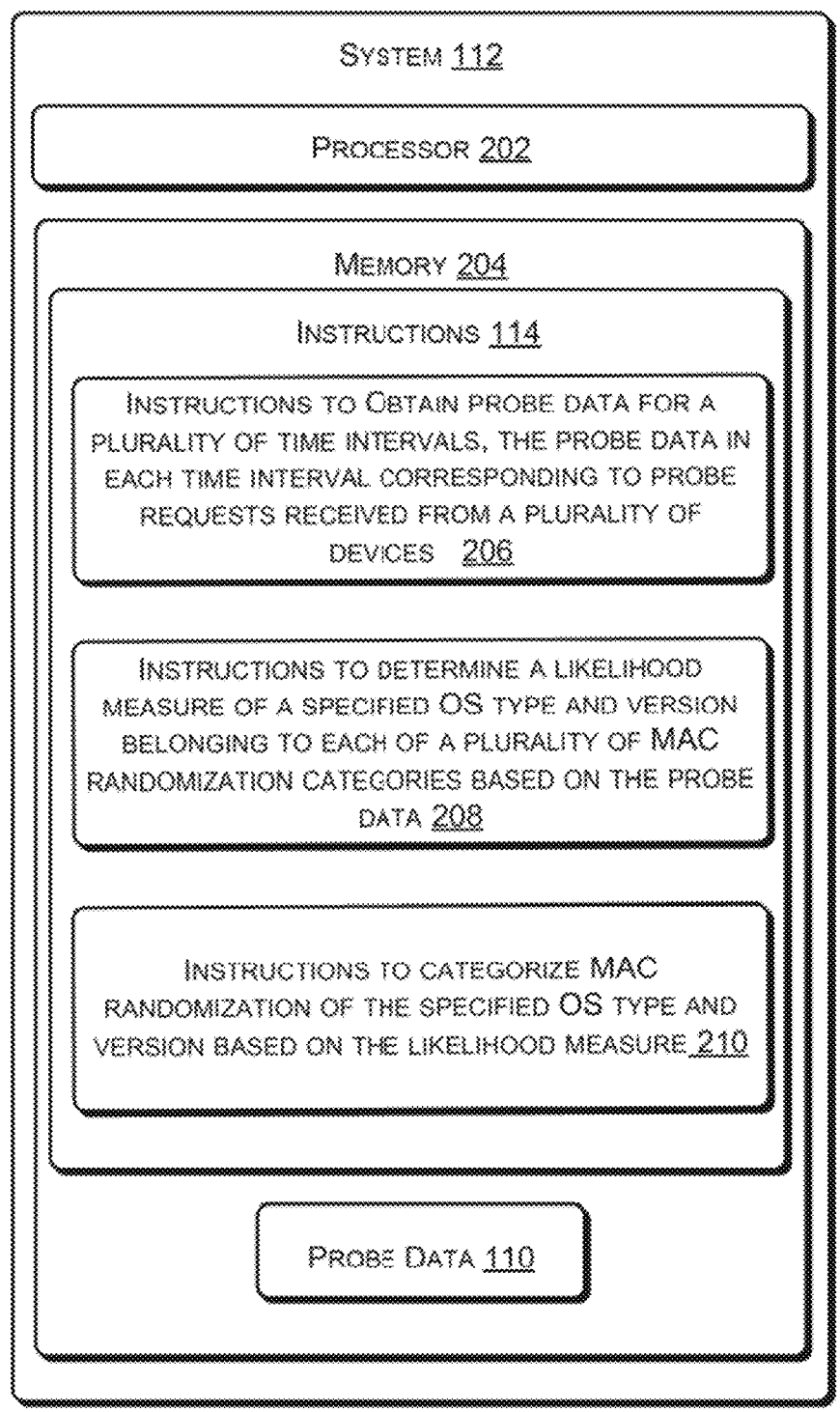
FIG. 2 illustrates an example system for categorization of MAC address randomization, in accordance with an example of the present subject matter.

FIG. 2 illustrates an example system 112 for categorization of MAC randomization, in accordance with an example of the present subject matter. The system 112 can be implemented as any computing system, such as desktop computer, laptop, tablet, notebook, server, and the like. The system 112 includes, among other components, a processor 202 and a memory 204.

The processor 202 may be implemented as a dedicated processor, a shared processor, or a plurality of individual processors, some of which may be shared. The memory 204 may be communicatively connected to the processor 202. Among other capabilities, the processor 202 may fetch and execute computer-readable instructions stored in the memory 204. The memory 204 may include any non-transitory computer-readable medium including, for example, volatile memory such as RAM, or non-volatile memory such as EPROM, flash memory, and the like. In addition, the system 112 may include other components, such as interfaces to communicate over the network 104 or directly with external storage or computing devices, display, input/output interfaces, operating systems, applications, data, and the like, which have not been described for brevity.

The memory 204 includes the instructions 114 to categorize the OS types and versions based on MAC address randomization capabilities.

In one example, the instructions 114 include instructions 206 to obtain probe data 110 for a plurality of time intervals, for example, from the database 108. While the probe data 110 is shown as being stored locally in the system 112, it will be understood that it may be stored in or received from an external source, such as the database 108. The probe data 110 in each time interval corresponds to probe requests received from a plurality of devices 102. For example, the probe data 110 corresponding to a probe request of a device 102 includes time stamp of receipt of the probe request, Media Access Control (MAC) address of the device 102, association status of the device 102, operating system (OS) type of the device 102, and OS version of the device 102.

Further, the instructions 114 include instructions 208 to determine a likelihood measure of a specified OS type and version belonging to each of a plurality of MAC randomization categories based on the probe data. In one implementation, to determine the likelihood measure, a percentage number of devices of the specified OS type and version that display behavior associated with each of the plurality of MAC randomization categories in one time interval is ascertained.

For example, in one time interval, the data points corresponding to OS type A version 1 may be selected. These data points correspond to probe requests received in the time interval from devices having the OS type A version 1 (OSAv1), both before and after association, for example, with a router. From the probe requests received after association, the real MAC address of the devices having the OSAv1 may be identified. Then, from the probe requests received before association, a frequency of the probe requests including the real MAC address prior to association may be determined for each device having the OSAv1.

Based on the frequency, each device having OSAv1 may be ascertained to display the behavior corresponding to one of a plurality of MAC randomization categories in the time interval. For example, some of the devices may provide randomized MAC addresses less than 10% of the time and the real MAC address greater than 90% of the time before association. Such devices may be ascertained to be in a first category corresponding to non-randomized MAC addresses. In another example, some of the devices may provide randomized MAC addresses for less than 90% of the time, but greater than 10% of the time and may provide the real MAC address for greater than 10% of the time, but less than 90% of the time. Such devices may be ascertained to be in a second category corresponding to partially randomized MAC addresses. In yet another example, some of the devices may provide randomized MAC addresses over 90% of the time and the real MAC address less than 10% of the time before association. Such devices may be ascertained to be in a third category corresponding to mostly randomized MAC addresses.

It will be understood that the number of categories and thresholds for each category may be varied based on the level of granularity with which the MAC address randomization is to be categorized and the aforementioned thresholds and categories are merely examples.

Such categorization of devices into one of a plurality of MAC randomization categories may be performed for each device in each time interval. Further, in each time interval, the percentage number of devices of a specified OS type and version displaying the behavior in each MAC randomization category may be determined. For example, in one time interval, 80% of the devices having OSAv1 may show non-randomized behavior, 15% of the devices having OSAv1 may show partially randomized behavior, and 5% of the devices having OSAv1 may show mostly randomized behavior. However, in another time interval, 70% of the devices having OSAv1 may show non-randomized behavior, 10% of the devices having OSAv1 may show partially randomized behavior, and 20% of the devices having OSAv1 may show mostly randomized behavior. The variation in behavior may be attributed to statistical variation in how the data points are recorded, etc.

The likelihood measure for the devices of the specified OS type and version belonging to each of the plurality of MAC randomization categories can be then determined based on an average percentage of the devices of the specified OS type and version displaying the behavior associated with a MAC randomization category over the plurality of time intervals and a confidence interval of the average percentage. For example, the average percentage of devices having OSAv1 belonging to non-randomized category can be determined as an average of the percentage of the devices having OSAv1 that displayed the behavior of non-randomized category over the plurality of time intervals. Further, a confidence interval of the average percentage may be computed based on t-statistic.

Further, the instructions 114 include instructions 210 to categorize MAC randomization of the specified OS type and version based on the likelihood measure. In one example, the specified OS type and version may be categorized into a MAC randomization category having a maximum likelihood measure when the confidence interval of the maximum likelihood measure is non-overlapping with confidence intervals of likelihood measures of other MAC randomization categories. In another example, the specified OS type and version may be categorized as a non-ascertainable MAC randomization category when, for a MAC randomization category having a maximum likelihood measure, the confidence interval of the maximum likelihood measure overlaps with the confidence interval of the likelihood measure of another MAC randomization category.

The MAC randomization categorization thus determined for the different OS types and versions may be provided to a user or another computing device for various purposes. In one example, the user may use the categorization to determine which OS types and versions have the greatest security risk and may thus provide increased security related services to those devices. In another example, the user may use the categorization to provide value added services to the users of the devices 102.

The categorization of MAC address randomization will now be explained with an example set of probe data. It will be understood that the example is provided to explain an implementation of the present subject matter and other example implementations will be evident to a person skilled in the art from the present disclosure. All such implementations are intended to be covered within the scope of the claims appended hereto.

A sample set of 500,000 data points or records was obtained as probe data. For the purpose of this example analysis, the probe data was generated by simulation of probe requests corresponding to probe requests received over 30 days from Wi-Fi enabled devices having different OS types and versions. However, it will be understood that the probe data may be obtained from a repository, such as the database 108, of data points received from real devices, such as the devices 102, by one or more routers, such as the routers 106.

The OS types and versions simulated were of three OS types (OS1, OS2, and OS3) and three versions (v1, v2, and v3) for each OS type. Thus, there were totally nine combinations of OS type and versions simulated (OS1v1, OS1v2, OS1v3, OS2v1, OS2v2, OS2v3, OS3v1, OS3v2, OS3v3).

The probe data was divided into successive non-overlapping time intervals of one day based on the timestamps. For each day, it was determined what percentage of devices of each OS type and version displayed behavior corresponding to each of a plurality of MAC randomization categories. The MAC randomization categories used were non-randomized, partially randomized, and mostly randomized. A device was categorized as non-randomized if, prior to association in the time interval, the probe requests sent by the device included the real MAC address for more than 90% of the probe requests. A device was categorized as partially randomized if, prior to association in the time interval, the probe requests sent by the device included the real MAC address for between 10-90% of the probe requests. A device was categorized as mostly randomized if, prior to association in the time interval, the probe requests sent by the device included the real MAC address for less than 10% of the probe requests. It will be understood that different number of MAC randomization categories and thresholds may be used in other example implementations.

Figure 3:
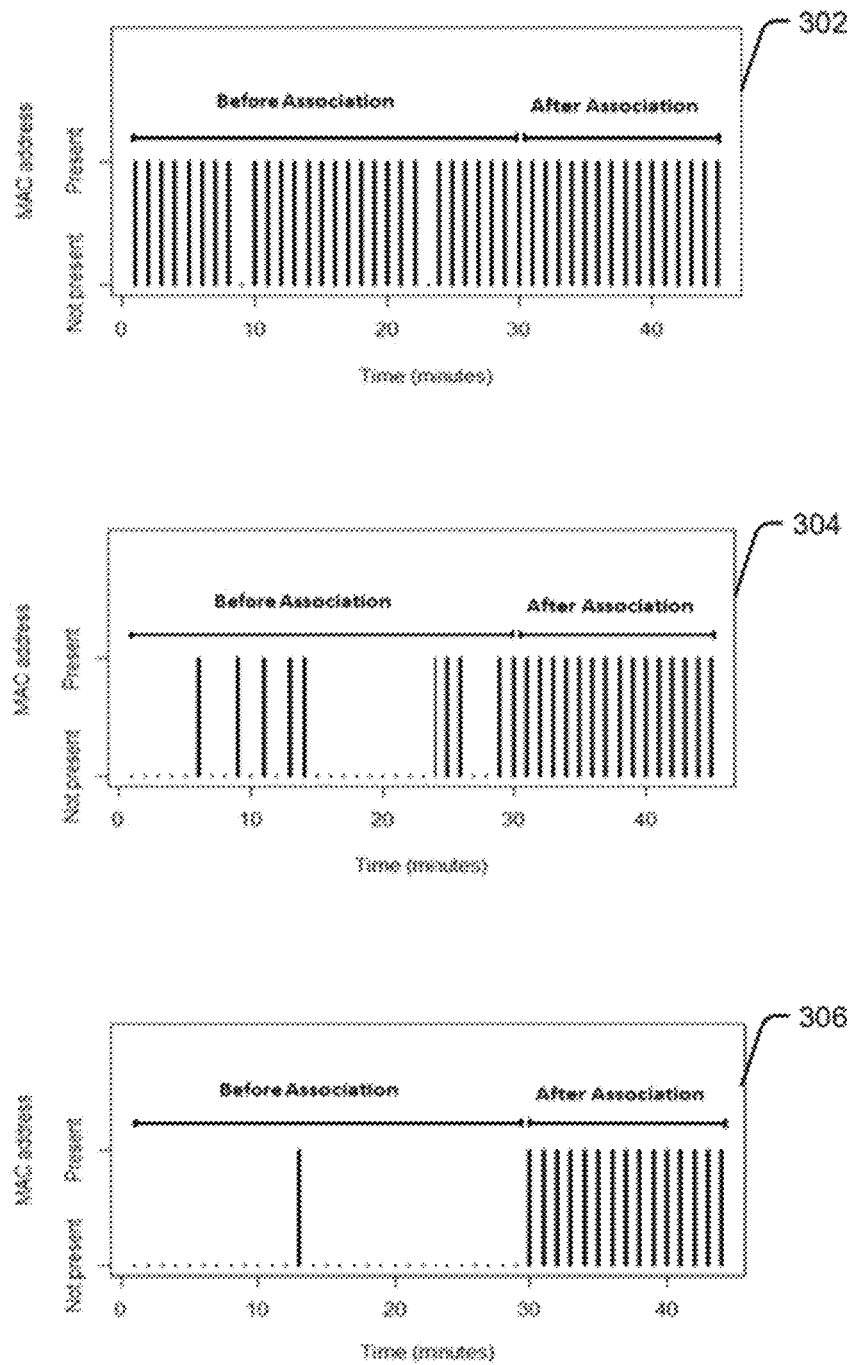
FIG. 3 illustrates example patterns of real MAC address being included in probe data for different categories of MAC address randomization, in accordance with an example of the present subject matter.

FIG. 3 illustrates example patterns of real MAC address being included in probe data for different categories of MAC randomization, in accordance with an example of the present subject matter.

As shown in chart 302, for a device that exhibits non-randomized behavior for MAC address randomization, the pattern shows that real MAC address is received at almost constant frequency. This is because the devices send out probe requests at constant intervals both before and after association. Hence, when the real MAC address is received for over 90% of the probe requests received prior to association, the real MAC address is seen at almost constant frequency.

As shown in chart 304, for a device that exhibits partially randomized behavior for MAC address randomization, the pattern shows that real MAC address is received at an irregular frequency and for 10-90% of the probe requests received prior to association. As shown in chart 306, for a device that exhibits mostly randomized behavior for MAC address randomization, the pattern shows that real MAC address is received rarely and for less than 10% of the probe requests received prior to association.

For ease of discussion, the non-randomized category is also referred to as category 1, partially randomized category is also referred to as category 2, and mostly randomized category is also referred to as category 3.

Based on the analysis as discussed earlier, the percentage number of devices of versions 1-3 of OS types 1-3 that displayed behavior in each category in a one day time interval was determined as shown in Tables 1-3 below.

TABLE 1

Percentage Number of devices of OS1 type and different versions displaying behavior corresponding to the different MAC randomization categories in each one day time interval over 30 days

| Day | Devices of OS1 Version 1 | | | Devices of OS1 Version 2 | | | Devices of OS1 Version 3 | | |
|---|---|---|---|---|---|---|---|---|---|
| | Category1 (%) | Category2 (%) | Category3 (%) | Category1 (%) | Category2 (%) | Category3 (%) | Category1 (%) | Category2 (%) | Category3 (%) |
| 1 | 85 | 12 | 3 | 85 | 13 | 2 | 22 | 77 | 1 |
| 2 | 86 | 11 | 3 | 70 | 26 | 4 | 32 | 66 | 2 |
| 3 | 89 | 7 | 4 | 83 | 13 | 4 | 26 | 67 | 7 |
| — | — | — | — | — | — | — | — | — | — |
| 30 | 91 | 6 | 3 | 89 | 6 | 5 | 34 | 64 | 2 |

TABLE 2

Percentage Number of devices of OS2 type and different versions displaying behavior corresponding to the different MAC randomization categories in each one day time interval over 30 days

| | Device of OS2 Version 1 | | | Devices of OS2 Version 2 | | | Devices of OS2 Version 3 | | |
|---|---|---|---|---|---|---|---|---|---|
| Day | Category1 (%) | Category2 (%) | Category 3 (%) | Category1 (%) | Category2 (%) | Category3 (%) | Category1 (%) | Category2 (%) | Category3 (%) |
| 1 | 45 | 47 | 8 | 8 | 67 | 7 | 55 | 43 | 2 |
| 2 | 84 | 14 | 2 | 28 | 66 | 6 | 41 | 56 | 3 |
| 3 | 82 | 17 | 1 | 26 | 67 | 7 | 22 | 68 | 10 |
| — | — | — | — | — | — | — | — | — | — |
| 30 | 81 | 18 | 1 | 22 | 72 | 7 | 39 | 60 | 1 |

TABLE 3

Percentage Number of devices of OS3 type and different versions displaying behavior corresponding to the different MAC randomization categories in each one day time interval over 30 days

| | Devices of OS3 Version 1 | | | Devices of OS3 Version 2 | | | Devices of OS3 Version 3 | | |
|---|---|---|---|---|---|---|---|---|---|
| Day | Category1 (%) | Category2 (%) | Category3 (%) | Category1 (%) | Category2 (%) | Category3 (%) | Category1 (%) | Category2 (%) | Category3 (%) |
| 1 | 39 | 60 | 1 | 19 | 78 | 3 | 1 | 57 | 42 |
| 2 | 27 | 68 | 5 | 36 | 63 | 1 | 2 | 47 | 51 |
| 3 | 23 | 73 | 4 | 23 | 71 | 6 | 2 | 71 | 27 |
| — | — | — | — | — | — | — | — | — | — |
| 30 | 19 | 78 | 3 | 25 | 71 | 4 | 7 | 70 | 23 |

A likelihood measure was then computed for each OS type and version for each category as discussed above. The likelihood measure for a particular category indicates the likelihood of the OS type and version belonging to the particular category. For this, an average of the percentage of devices of the OS type and version that displayed behavior corresponding to the particular category over 30 days was determined and a confidence interval was computed for the average percentage number.

For the analysis in this example, a 90% confidence interval was selected to ensure that 90% of times the percentage of devices of the specific OS type and version fall under that particular category. This means that the percentage of devices of the specific OS type and version falling under that particular category will be in the range of upper and lower value of confidence interval at least 90 times out of 100 times. In other examples, other confidence intervals may be used.

For example, for devices of OSIv1, the percentage of devices displaying behavior of category 1 on each day in the 30-day period was [85, 86, 89, 90, 81, 84, 83, 88, 81, 88, 80, 88, 84, 83, 89, 80, 80, 90, 85, 80, 88, 84, 84, 86, 86, 90, 82, 86, 81, 91] and the average percentage was 85.06. The standard deviation was 3.48. The 90% confidence interval was determined based on t-statistic as average±t* standard deviation since the underlying nature of distribution of the sample data is unknown. The t value is 1.6691 for a sample size of 30. The 90% confidence interval was thus found to be [79.14, 90.98].

Similarly, the likelihood measure, i.e., average percentage and confidence interval, of OS1v1 was found for each MAC randomization category as shown below:

For devices of OS1v1, the percentage of devices displaying behavior of category 2 on each day in the 30-day period was [9, 16, 11, 13, 10, 11, 15, 7, 9, 13, 16, 10, 15, 14, 10, 19, 17, 5, 6, 11, 18, 8, 12, 15, 9, 12, 6, 14, 9, 18] and confidence interval obtained for category 2=[5.40, 18.45].

For devices of OS1v1, the percentage of devices displaying behavior of category 3 on each day in the 30-day period was =[1, 3, 5, 4, 2, 3, 4, 4, 3, 2, 4, 2, 1, 3, 1, 1, 3, 4, 4, 4, 2, 4, 4, 1, 5, 2, 4, 4, 5, 1] and confidence interval obtained for category 3=[0.72, 5.27].

The maximum likelihood for OS1v1, corresponding to the highest average and leading confidence interval, was from category 1 and the next leading confidence interval was from category 2. It was found that there is no overlap between them and so it is confirmed that OS1v1 belongs to category 1. Hence, OS1v1 was categorized as belonging to MAC randomization category 1, i.e., non-randomized category.

Similar computations were performed for the other eight OS types and versions as well. The computations for an OS type and version in which category was found to be unascertainable, i.e., OS type 2 version 3 is also provided below.

For devices of OS2v3, the percentage of devices displaying behavior of category 1 on each day in the 30-day period was [42, 36, 26, 23, 44, 37, 45, 50, 26, 31, 32, 46, 31, 51, 25, 29, 22, 28, 26, 36, 28, 41, 43, 27, 28, 37, 42, 45, 52, 46]. The average percentage was thus found to be 35.83 with a standard deviation of 9.14. The confidence interval for category 1 was found to be 35.83±1.6691*9.14, i.e., [20.57, 51.36]

For devices of OS2v3, the percentage of devices displaying behavior of category 2 on each day in the 30-day period was [51, 57, 64, 70, 49, 62, 48, 45, 67, 63, 66, 48, 59, 48, 68, 67, 69, 62, 65, 59, 62, 54, 47, 66, 63, 54, 56, 45, 46, 52] and confidence interval for category 2 was found to be [43.82, 71.64]

For devices of OS2v3, the percentage of devices displaying behavior of category 3 on each day in the 30-day period was [7, 7, 10, 77, 1, 7, 5, 7, 6, 2, 6, 10, 1, 7, 4, 9, 10, 9, 5, 10, 5, 10, 7, 9, 9, 2, 10, 2, 10, 2] and the confidence interval for category 3 was found to be [1.39, 11.47].

Thus, in the case of OS2v3, the confidence interval of category with maximum likelihood was of category 2.

However, it was found to overlap with the confidence interval of category 1 as upper limit of category 1 is higher than lower limit of category 2. Hence, it was found that the category of OS type 2 version 3 couldn't be determined, i.e., was unascertainable.

Figure 4:
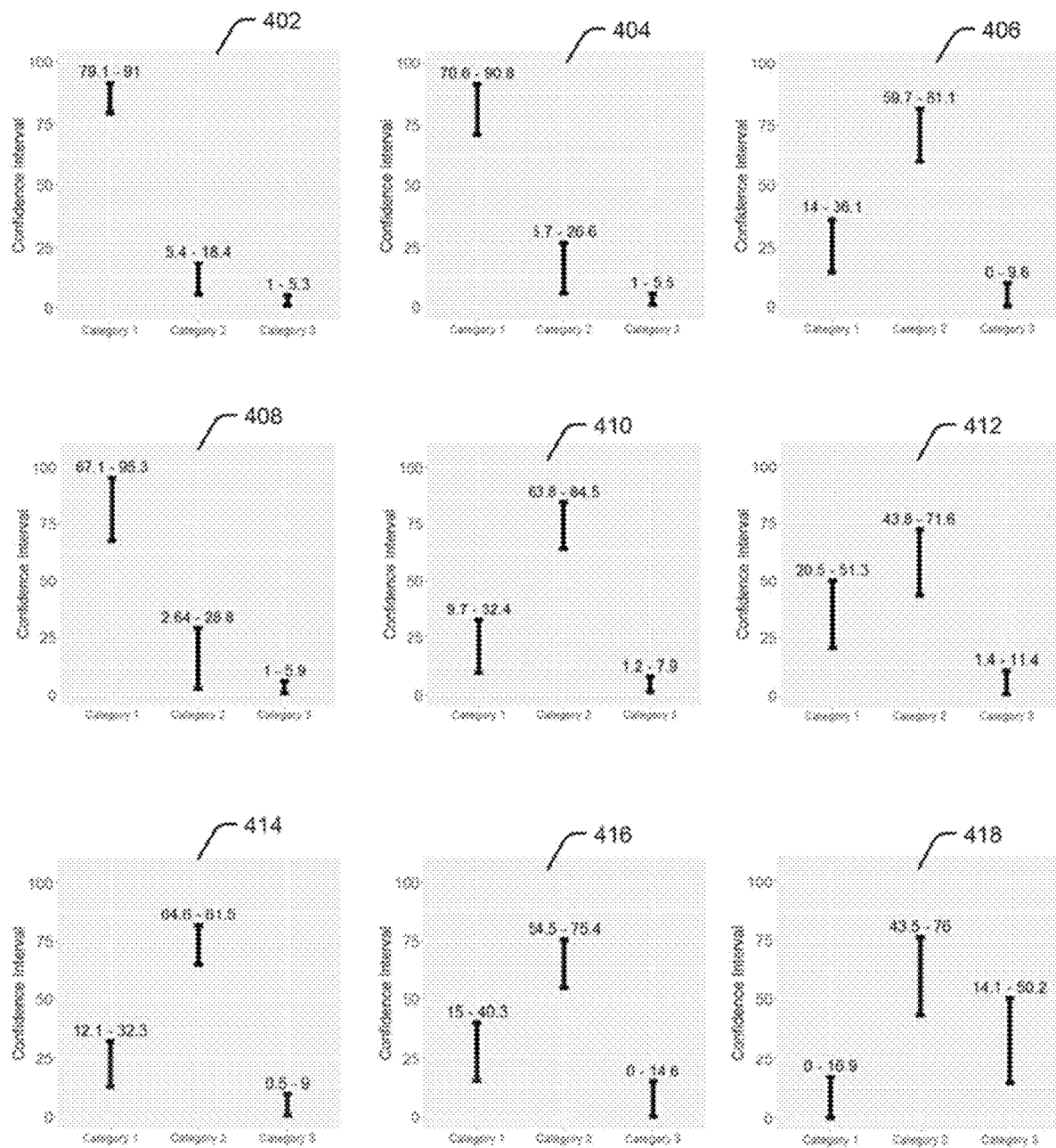
FIG. 4 illustrates example plots of likelihood measures for categorization of MAC address randomization, in accordance with an example of the present subject matter.

FIG. 4 illustrates example plots of likelihood measures for categorization of MAC address randomization for each of the nine OS type and versions, in accordance with the afore-discussed example of the present subject matter.

Plot 402 illustrates the likelihood measures as computed above for OS1v1. As can be seen clearly, there is no overlap between the confidence interval of the maximum likelihood measure and other likelihood measures and so OS1v1 can be categorized as belonging to category 1.

Plot 404 illustrates the likelihood measures for OS1v2. Here, the maximum likelihood measure is for category 1 and is non-overlapping with other likelihood measures. Hence, OS1v2 can be categorized as belonging to category 1.

Plot 406 illustrates the likelihood measures for OS1v3. Here, the maximum likelihood measure is for category 2 and is non-overlapping with other likelihood measures. Hence, OS1v3 can be categorized as belonging to category 2.

Plot 408 illustrates the likelihood measures for OS2v1. Here, the maximum likelihood measure is for category 1 and is non-overlapping with other likelihood measures. Hence, OS2v1 can be categorized as belonging to category 1.

Plot 410 illustrates the likelihood measures for OS2v2. Here, the maximum likelihood measure is for category 2 and is non-overlapping with other likelihood measures. Hence, OS2v2 can be categorized as belonging to category 2.

Plot 412 illustrates the likelihood measures for OS2v3. Here, the maximum likelihood measure is for category 2, but the confidence interval of category 2 is overlapping with confidence interval of likelihood measure of category 1. Hence, category of OS2v3 is non-ascertainable.

Plot 414 illustrates the likelihood measures for OS3v1. Here, the maximum likelihood measure is for category 2 and is non-overlapping with other likelihood measures. Hence, OS3v1 can be categorized as belonging to category 2.

Plot 416 illustrates the likelihood measures for OS3v2. Here, the maximum likelihood measure is for category 2 and is non-overlapping with other likelihood measures. Hence, OS3v2 can be categorized as belonging to category 2.

Plot 418 illustrates the likelihood measures for OS3v3. Here, the maximum likelihood measure is for category 2, but the confidence interval of category 2 is overlapping with confidence interval of likelihood measure of category 3. Hence, category of OS3v3 is non-ascertainable.

Figure 5:
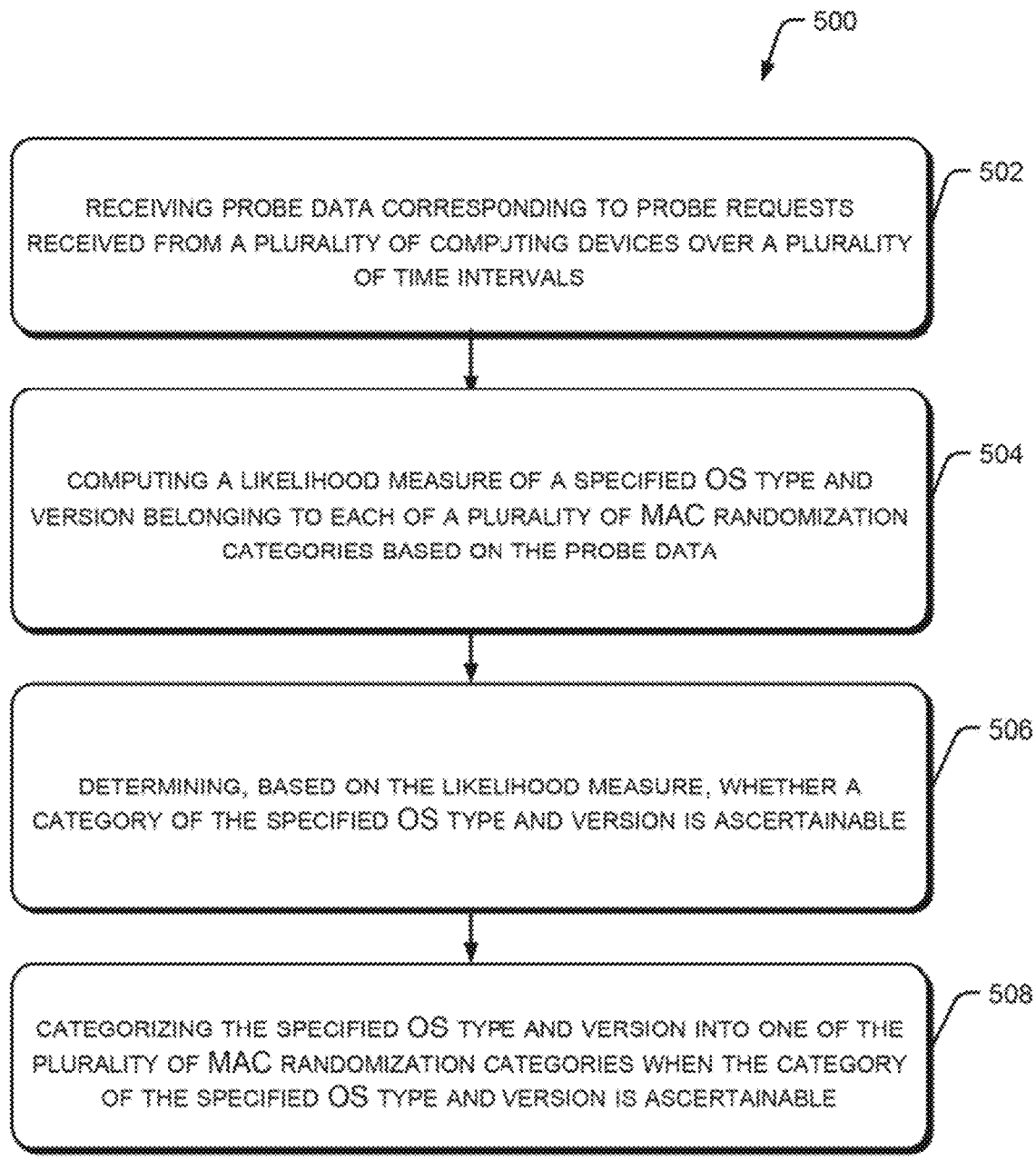
FIG. 5 illustrates an example method for categorization of MAC address randomization, in accordance with an example of the present subject matter.
Figure 6:
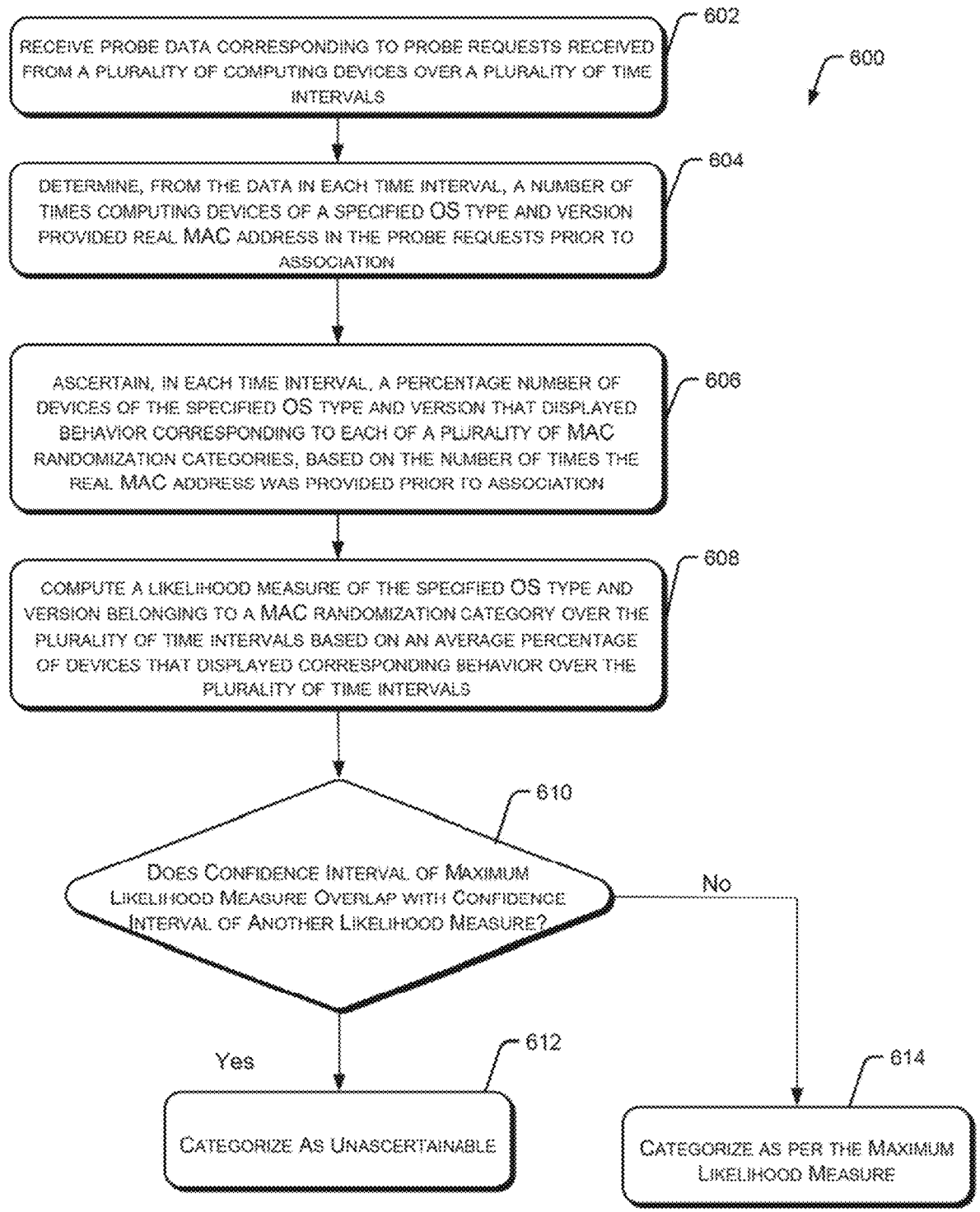
FIG. 6 illustrates another example method for categorization of MAC address randomization, in accordance with an example of the present subject matter.

FIGS. 5 and 6 illustrate example methods 500 and 600 for categorization of MAC address randomization, in accordance with example implementations of the present subject matter. The order in which the methods 500 and 600 are described is not intended to be construed as a limitation, and some of the described method blocks can be combined in a different order to implement the methods, or alternative methods.

Furthermore, the methods 500 and 600 may be implemented in any suitable hardware, computer-readable instructions, or combination thereof. The steps of the methods 500 and 600 may be performed by either a computing device under the instruction of machine executable instructions stored on a non-transitory computer readable medium or by dedicated hardware circuits, microcontrollers, or logic circuits. For example, the methods 500 and 600 may be performed by the system 112 in the network environment 100. Herein, some examples are also intended to cover non-transitory computer readable medium, for example, digital data storage media, which are computer readable and encode computer-executable instructions, where said instructions perform some or all of the steps of the described methods 500 and 600.

With reference to FIG. 5 and method 500, at block 502, probe data corresponding to probe requests received from a plurality of devices over a plurality of time intervals is received. For example, the probe data corresponding to a probe request of a device includes a time stamp. Media Access Control (MAC) address of the device, association status of the device, operating system (OS) type of the device, and OS version of the device.

At block 504, a likelihood measure of a specified OS type and version belonging to each of a plurality of MAC randomization categories is computed based on the probe data. For example, the likelihood measure of the specified OS type and version belonging to the MAC randomization category includes an average percentage number of devices of the specified OS type and version that displayed corresponding behavior and a confidence interval of the average percentage computed based on t-statistic.

At block 506, it is determined, based on the likelihood measure, whether a category of the specified OS type and version is ascertainable. For example, the category of the specified OS type and version is ascertainable when, for the MAC randomization category having a maximum likelihood measure, a confidence interval of the maximum likelihood measure does not overlap with a confidence interval of the likelihood measure of another MAC randomization category.

At block 508, the specified OS type and version is categorized into one of the plurality of MAC randomization categories when the category of the specified OS type and version is ascertainable. For example, the plurality of MAC randomization categories includes not randomized, partially randomized, and mostly randomized.

With reference to FIG. 6 and method 600, at block 602, probe data corresponding to probe requests received from a plurality of devices over a plurality of time intervals is received.

At block 604, from the data in each time interval, a number of times devices of a specified OS type and version provided real MAC address in the probe requests prior to association is determined. For example, for each device, it is found how frequently the real MAC address was received prior to association and accordingly, a MAC address randomization category is determined for each device.

At block 606, in each time interval, a percentage number of devices of the specified OS type and version that displayed behavior corresponding to each of a plurality of MAC randomization categories is ascertained based on the number of times the real MAC address was received prior to association. Thus, it can be found, what percentage of devices of the specified OS type and version displayed the behavior corresponding to each MAC randomization category.

At block 608, a likelihood measure of the specified OS type and version belonging to a MAC randomization category over the plurality of time intervals is computed based on an average percentage of the devices of the specified OS type and version that displayed corresponding behavior over the plurality of time intervals.

At block 610, it is determined if the confidence Interval of maximum likelihood measure overlaps with confidence interval of another likelihood measure.

At block 612, if the confidence interval is found to be overlapping, the specified OS type and version is categorized as unascertainable.

At block 614, if the confidence interval is found to be non-overlapping, the specified OS type and version is categorized in one of the plurality of MAC randomization categories as per the maximum likelihood measure.

Although examples for the present disclosure have been described in language specific to structural features and/or methods, it should be understood that the appended claims are not necessarily limited to the specific features or methods described. Rather, the specific features and methods are disclosed and explained as examples of the present disclosure.

We claim:

1. A system comprising:
    a processor; and
    a memory coupled to the processor, wherein the processor fetches and executes instructions from the memory to:
        obtain probe data for a plurality of time intervals, the probe data in each time interval corresponding to probe requests received from a plurality of devices;
        determine, for each of a plurality of Media Access Control (MAC) address randomization categories and based on the probe data, a respective likelihood measure that a specified Operating System (OS) type and version belongs to the MAC address randomization category,
            wherein each MAC address randomization category is associated with a different minimum threshold percentage indicative of a minimum percentage of probe requests sent from a given device over a time interval that need to include randomized MAC addresses in order for the given device to be categorized in the MAC address randomization category; and
        categorize MAC address randomization of the specified OS type and version based on one or more respective likelihood measures.

2. The system as claimed in claim 1, wherein, to determine each respective likelihood measure, the processor fetches and executes the instructions to ascertain, in each time interval, a respective percentage of devices running the specified OS type and version that are categorized into each of the plurality of MAC address randomization categories.

3. The system as claimed in claim 2, wherein to ascertain that, in a time interval, a first device running the specified OS type and version is to be categorized into a first MAC address randomization category of the plurality of MAC address randomization categories, the processor fetches and executes the instructions to:
    identify a real MAC address of the first device from the probe requests received from the first device post association; and
    determine a frequency of the probe requests received from the first device prior to the association in the time interval that include the read MAC address.

4. The system as claimed in claim 1, wherein the respective likelihood measure that the specified OS type and version belongs to a first MAC address randomization category includes an average percentage of the devices running the specified OS type and version that display behavior associated with the first MAC address randomization category over the plurality of time intervals and a confidence interval of the average percentage.

5. The system as claimed in claim 1, wherein the processor fetches and executes the instructions to categorize the specified OS type and version into a particular MAC address randomization category having a maximum respective likelihood measure that is non-overlapping with confidence intervals of the respective likelihood measures of other MAC address randomization categories.

6. The system as claimed in claim 1, wherein the processor fetches and executes the instructions to categorize the specified OS type and version as a non-ascertainable MAC address randomization category when, for a particular MAC address randomization category having a maximum respective likelihood measure for the specified OS type and version, a confidence interval of the maximum respective likelihood measure overlaps with a confidence interval of the respective likelihood measure of another MAC address randomization category.

7. The system of claim 1, wherein the processor fetches and executes the instructions to categorize each device running the specified OS type and version into a respective MAC address randomization category having a largest minimum threshold percentage that does not exceed a percentage of probe requests sent by the device that include randomized MAC addresses.

8. A method comprising:
    receiving probe data corresponding to probe requests received from a plurality of devices over a plurality of time intervals;
    computing, for each of a plurality of Media Access Control (MAC) address randomization categories and based on the probe data, a respective likelihood measure that a specified OS type and version belongs to the MAC address randomization category,
        wherein each MAC address randomization category is associated with a different minimum threshold percentage indicative of a minimum percentage of probe requests sent from a given device over a time interval that need to include randomized MAC addresses in order for the given device to be categorized in the MAC address randomization category;
    determining, based on one or more respective likelihood measures, whether a category of the specified OS type and version is ascertainable; and
    categorizing the specified OS type and version into one of the plurality of MAC address randomization categories when the category of the specified OS type and version is ascertainable.

9. The method as claimed in claim 8, wherein the respective likelihood measure that the specified OS type and version belongs to a particular MAC address randomization category comprises an average percentage of the devices running the specified OS type and version that were categorized into the particular MAC address randomization category and a confidence interval of the average percentage computed based on a t-statistic.

10. The method as claimed in claim 8, wherein the category of the specified OS type and version is ascertainable when, for a MAC address randomization category having a maximum respective likelihood measure, a confidence interval of the maximum respective likelihood measure does not overlap with a confidence interval of the respective likelihood measure of another MAC address randomization category.

11. The method as claimed in claim 8, wherein the specified OS type and version is categorized as non-ascertainable when, for a MAC address randomization category having a maximum respective likelihood measure, a confidence interval of the maximum respective likelihood measure overlaps with a confidence interval of the respective likelihood measure of another MAC address randomization category.

12. The method as claimed in claim 8, wherein computing the respective likelihood measure that the specified OS type and version belongs to a particular MAC address randomization category comprises:
   determining, from the probe data in each time interval, a number of times devices running the specified OS type and version provided a real MAC address in the probe requests received from the devices prior to association;
   categorizing, for each time interval, each device running the specified OS type and version into a respective MAC address randomization category based on the number of times the real MAC address was received from the device prior to association;
   ascertaining, in each time interval, a percentage of the devices running the specified OS type and version that were categorized into the particular MAC address randomization category based on the number of times the real MAC address was received prior to association; and
   computing the respective likelihood measure that the specified OS type and version belongs to the particular MAC address randomization category over the plurality of time intervals based on the average percentage of devices categorized into the particular MAC address randomization category over the plurality of time intervals.

13. The method as claimed in claim 12, wherein categorizing, in each time interval, each device running the specified OS type and version into the respective MAC address randomization category comprises:
   identifying real MAC address of a device from the probe requests received post association; and
   determining a pattern of the probe requests received in the time interval from the device prior to the association that included the real MAC address.

14. The method as claimed in claim 12, wherein the plurality of MAC address randomization categories comprises a not randomized category, a partially randomized category, and a mostly randomized category, wherein
   a device running the specified OS type and version is categorized in the not randomized category when the real MAC address of the device was received in at least a first threshold percentage of probe requests received in the time interval from the device prior to association;
   the device running the specified OS type and version is categorized in the partially randomized category when the real MAC address of the device was received in greater than a second threshold percentage but less than the first threshold percentage of the probe requests received in the time interval from the device; and
   the device running the specified OS type and version is categorized in the mostly randomized category when the real MAC address was received in less than a third threshold percentage of the probe requests received in the time interval from the device, the third threshold percentage being less than the second threshold percentage.

15. A non-transitory computer-readable medium comprising instructions for categorizing MAC address randomization, the instructions being executable by a processing resource to:
   receive data corresponding to probing signals received from a plurality of devices over a plurality of time intervals;
   ascertain, in each time interval, a percentage number of devices of a specified OS type and version that displayed behavior corresponding to each of a plurality of MAC address randomization categories;
   compute a likelihood measure of the specified OS type and version belonging to a MAC address randomization category of the plurality of time intervals based on an average percentage of the devices that displayed corresponding behavior over the plurality of time intervals; and
   categorize MAC address randomization of the specified OS type and version based on the likelihood measure.

16. The non-transitory computer-readable medium as claimed in claim 15, wherein the probe data corresponding to each probe request of each device includes time stamp, MAC address of the device, association status of the device, operating system (OS) type of the device, and OS version of the device.

17. The non-transitory computer-readable medium as claimed in claim 15, wherein, to ascertain, in each time interval, the percentage number of devices of a specified OS type and version displaying behavior corresponding to each of a plurality of MAC address randomization categories, the instructions are executable by the processor to:
   determine, from the probe data, in a time interval for a device of the specified OS type and version, a frequency of receiving real MAC address in the probe requests prior to association, wherein the real MAC address is identified from the probe requests post association; and
   ascertain the device as displaying behavior of one of the plurality of MAC address randomization categories based on the frequency of the real MAC address being received, wherein the plurality of MAC address randomization categories includes not randomized, partially randomized, and mostly randomized.

18. The non-transitory computer-readable medium as claimed in claim 17, wherein the instructions are executable by the processor to:
   ascertain the devices of the specified OS type and version as displaying behavior corresponding to the not randomized category when the frequency is substantially regular;
   ascertain the devices of the specified OS type and version as displaying behavior corresponding to the partially randomized category when the frequency is substantially irregular; and
   ascertain the devices of the specified OS type and version as displaying behavior corresponding to the mostly randomized category when the frequency is rare.

19. The non-transitory computer-readable medium as claimed in claim 15, wherein, the instructions are executable by the processor to categorize the specified OS type and version into one of the plurality of MAC address randomization categories when, for the MAC address randomization category having a maximum likelihood measure, a confidence interval of the maximum likelihood measure does not overlap with a confidence interval of the likelihood measure of another MAC address randomization category.

20. The non-transitory computer-readable medium as claimed in claim 15, wherein, the instructions are executable by the processor to categorize the specified OS type and version as a non-ascertainable MAC address randomization category when the confidence interval of a maximum likelihood measure overlaps with the confidence interval of the likelihood measure of another MAC address randomization category.

21. A system comprising:
a processor; and
a memory coupled to the processor, wherein the processor fetches and executes instructions from the memory to:
- obtain probe data for a plurality of time intervals, the probe data in each time interval corresponding to probe requests received from a plurality of devices;
- determine, for each of a plurality of Media Access Control (MAC) address randomization categories and based on the probe data, a respective likelihood measure that a specified Operating System (OS) type and version belongs to the MAC address randomization category, wherein, to determine each respective likelihood measure, the processor fetches and executes the instructions to ascertain, in each time interval, a respective percentage of devices running the specified OS type and version that are categorized into each of the plurality of MAC address randomization categories; and
- categorize MAC address randomization of the specified OS type and version based on one or more respective likelihood measures.

* * * * *